US011221901B2

(12) United States Patent
Panesar et al.

(10) Patent No.: US 11,221,901 B2
(45) Date of Patent: Jan. 11, 2022

(54) MONITORING PROCESSORS OPERATING IN LOCKSTEP

(71) Applicant: UltraSoC Technologies Limited, Cambridge (GB)

(72) Inventors: Gajinder Panesar, Bristol (GB); Iain Robertson, Bedford (GB); Hanan Moller, Wotton-Under-Edge (GB); Callum Stewart, Livingston (GB); Melvin Cheah, Cambridge (GB)

(73) Assignee: SIEMENS INDUSTRY SOFTWARE INC., Plano, TX (US)

( * ) Notice: Subject to any disclaimer, the term of this patent is extended or adjusted under 35 U.S.C. 154(b) by 62 days.

(21) Appl. No.: 16/696,812

(22) Filed: Nov. 26, 2019

(65) Prior Publication Data
US 2021/0157667 A1 May 27, 2021

(51) Int. Cl.
*G06F 11/07* (2006.01)
(52) U.S. Cl.
CPC ...... *G06F 11/0751* (2013.01); *G06F 11/0724* (2013.01); *G06F 11/0775* (2013.01)
(58) Field of Classification Search
CPC ............. G06F 11/0751; G06F 11/0724; G06F 11/0775; G06F 11/3636; G06F 11/3656
See application file for complete search history.

(56) References Cited

U.S. PATENT DOCUMENTS

| 5,640,508 A * | 6/1997 | Fujiwara | G06F 11/1633 |
| | | | 714/30 |
| 6,604,177 B1 | 8/2003 | Kondo et al. | |
| 10,754,760 B1 * | 8/2020 | Levy | G06F 11/3656 |
| 2003/0061535 A1 * | 3/2003 | Bickel | G06F 11/1658 |
| | | | 714/11 |
| 2012/0030519 A1 | 2/2012 | Wilt et al. | |
| 2019/0114243 A1 | 4/2019 | Santoni et al. | |
| 2019/0303260 A1 * | 10/2019 | Ozer | G06F 11/27 |

OTHER PUBLICATIONS

PCT International Search Report and Written Opinion of International Searching Authority dated Mar. 25, 2021, corresponding to PCT International Application No. PCT/EP2020/083426.

* cited by examiner

*Primary Examiner* — Nadeem Iqbal
(74) *Attorney, Agent, or Firm* — Lempia Summerfield Katz LLC

(57) ABSTRACT

An integrated circuit (IC) chip includes system circuitry having system memory, and a master processor and a checker processor configured to operate in lockstep; and monitoring circuitry comprising an internal lockstep monitor, a master tracer and a checker tracer. The internal lockstep monitor is configured to: observe states of internal signals of the master processor and the checker processor, compare corresponding observed states of the master processor and the checker processor, and if the corresponding observed states differ: trigger the master tracer to output stored master trace data recorded from the output of the master processor, and trigger the checker tracer to output stored checker trace data recorded from the output of the checker processor.

22 Claims, 7 Drawing Sheets

MONITORING PROCESSORS OPERATING IN LOCKSTEP

FIELD OF THE INVENTION

This invention relates to monitoring processors on a System-on-Chip (SoC) or multi-chip module (MCM).

BACKGROUND

In high integrity systems it is known to utilise two central processing units (CPUs) running in lockstep on a SoC. Both CPUs run the same code at the same speed, in a redundant backup configuration. One CPU acts as a master and the other as a checker. The master's memory access requests are propagated to the system memory, whereas the checker's access requests may not be. A lockstep monitor is provided to cross-check the memory access requests of the master and checker. Specifically, the lockstep monitor checks to see if access to the same memory addresses are requested in the same order by the master and the checker. The lockstep monitor also checks to see if the same data is requested to be written to memory in the same order by both the master and the checker. Discrepancies in corresponding memory access requests of the master and checker are identified.

Typically, the lockstep monitor is provided off-chip and does not perform the cross-checking operation in real time. Thus, there is significant delay between an error occurring which results in the two CPUs' divergent memory access requests, and that error being detected by the lockstep monitor.

It would be desirable to speed up the cross-checking of CPUs operating in lockstep, and also to increase the rate at which lockstep monitors identify divergent behaviour of CPUs.

SUMMARY OF THE INVENTION

According to a first aspect, there is provided an integrated circuit (IC) chip comprising: system circuitry comprising system memory, and a master processor and a checker processor configured to operate in lockstep; and monitoring circuitry comprising an internal lockstep monitor, a master tracer and a checker tracer, the internal lockstep monitor configured to: observe states of internal signals of the master processor and the checker processor, compare corresponding observed states of the master processor and the checker processor, and if the corresponding observed states differ: trigger the master tracer to output stored master trace data recorded from the output of the master processor, and trigger the checker tracer to output stored checker trace data recorded from the output of the checker processor.

The internal lockstep monitor may be further configured to, if the corresponding observed states differ, output the corresponding observed states.

The internal lockstep monitor may comprise: an internal master buffer configured to accumulate observed states of the master processor; an internal checker buffer configured to accumulate observed states of the checker processor; and a comparator configured to compare each observed state of the master processor from the internal master buffer with the corresponding observed state of the checker processor from the internal checker buffer.

The internal lockstep monitor may further comprise a timer configured to: count the elapsed time between an observed state of the master processor being accumulated in the internal master buffer, and an observed state of the checker processor being accumulated in the internal checker buffer; and if that elapsed time exceeds a timeout threshold, output an alert.

The monitoring circuitry may further comprise an output lockstep monitor configured to: observe memory accesses requested by the master processor and the checker processor, compare corresponding requested memory accesses of the master processor and the checker processor, and if the corresponding requested memory accesses differ: trigger the master tracer to output stored master trace data recorded from the output of the master processor, trigger the checker tracer to output stored checker trace data recorded from the output of the checker processor, and trigger the internal lockstep monitor to output observed states of the master processor and checker processor.

The internal lockstep monitor may be configured to, if the corresponding observed states differ, trigger the output lockstep monitor to output requested memory accesses of the master processor and the checker processor.

The monitoring circuitry may further comprise a lockstep access filter configured to: receive the output of the master processor; receive the output of the checker processor; prevent requested memory accesses of the checker processor from propagating to the system memory; and send to the checker processor messages from the system memory intended for the master processor.

The internal lockstep monitor may be configured to, if the corresponding observed states differ, trigger the lockstep access filter to output requested memory accesses of the master processor and the checker processor.

The system circuitry may further comprise a further checker processor configured to operate in lockstep with the master processor and the checker processor, and the internal lockstep monitor may be configured to: observe states of internal signals of the further checker processor, compare corresponding observed states of the further checker processor and master processor and checker processor, and if any of the corresponding observed states differ: trigger the master tracer to output stored master trace data recorded from the output of the master processor, and trigger the checker tracer to output stored checker trace data recorded from the output of the checker processor.

The internal lockstep monitor may be configured to carry out the observing, comparing and triggering steps at the runtime of the master and checker processors.

According to a second aspect, there is provided an IC chip comprising: system circuitry comprising system memory, and a master processor and a checker processor configured to operate in lockstep; and monitoring circuitry comprising an output lockstep monitor and analysing circuitry, the output lockstep monitor configured to: observe requested memory accesses of the master processor and the checker processor, compare corresponding requested memory accesses of the master processor and the checker processor, and if the corresponding requested memory accesses differ, trigger the analysing circuitry to output recorded observed states of internal signals of the master processor and checker processor.

The monitoring circuitry may further comprise a master tracer and a checker tracer, wherein if the corresponding requested memory accesses differ, the output lockstep monitor may be configured to: trigger the master tracer to output stored master trace data recorded from the output of the master processor, and trigger the checker tracer to output stored checker trace data recorded from the output of the checker processor.

The analysing circuitry may comprise a master analyser configured to observe states of internal signals of the master processor, and a checker analyser configured to observe states of internal signals of the checker processor.

The analysing circuitry may be an internal lockstep monitor configured to: observe states of internal signals of the master processor and the checker processor, compare corresponding observed states of the master processor and the checker processor, and if the corresponding observed states differ: trigger the master tracer to output stored master trace data recorded from the output of the master processor, and trigger the checker tracer to output stored checker trace data recorded from the output of the checker processor.

If the corresponding observed states differ, the internal lockstep monitor may be configured to trigger the output lockstep monitor to output requested memory accesses of the master processor and the checker processor.

The output lockstep monitor may be further configured to, if the corresponding requested memory accesses differ, output the corresponding requested memory accesses.

The output lockstep monitor may comprise: an output master buffer configured to accumulate memory access requests of the master processor; an output checker buffer configured to accumulate memory access requests of the checker processor; and a comparator configured to compare each memory access request of the master processor from the output master buffer with the corresponding memory access request of the checker processor from the output checker buffer.

The output lockstep monitor may further comprises a timer configured to: count the elapsed time between a memory access request of the master processor being accumulated in the output master buffer, and a memory access request of the checker processor being accumulated in the output checker buffer; and if that elapsed time exceeds a timeout threshold, outputting an alert.

The monitoring circuitry may further comprise a lockstep access filter configured to: receive the output of the master processor; receive the output of the checker processor; prevent requested memory accesses of the checker processor from propagating to the system memory; and send to the checker processor messages from the system memory intended for the master processor.

The output lockstep monitor may be configured to, if the corresponding requested memory accesses differ, trigger the lockstep access filter to output requested memory accesses of the master processor and the checker processor.

The system circuitry may further comprise a further checker processor configured to operate in lockstep with the master processor and the checker processor, and the output lockstep monitor is configured to: observe requested memory accesses of the further checker processor, compare corresponding requested memory accesses of the further checker processor and master processor and checker processor, and if any of the corresponding requested memory accesses differ, trigger the analysing circuitry to output recorded observed states of internal signals of the master processor and checker processor and further checker processor.

The output lockstep monitor may be configured to carry out the observing, comparing and triggering steps at the runtime of the master and checker processors.

BRIEF DESCRIPTION OF THE DRAWINGS

The present invention will now be described by way of example with reference to the accompanying drawings. In the drawings.

DETAILED DESCRIPTION

The following disclosure describes a monitoring architecture suitable for implementation on an integrated circuit chip. The integrated circuit chip may be a SoC or a multi-chip module (MCM).

FIGS. 1, 2, 3, 5 and 6 are schematic diagrams of exemplary system architectures, and components within the system architectures. These figures present the structures in terms of functional blocks. Some functional blocks for carrying out functions well known in the art have in places been omitted from these figures. FIGS. 4 and 7 are flowcharts illustrating methods of responding to divergent behaviour in processors operating in lockstep. Each flowchart depicts an order in which the method of that flowchart can be performed. However, the flowcharts are not intended to restrict the described methods to being implemented in the orders depicted. The steps of the methods may be carried out in alternative orders to those depicted in the flowcharts.

Figure 1:
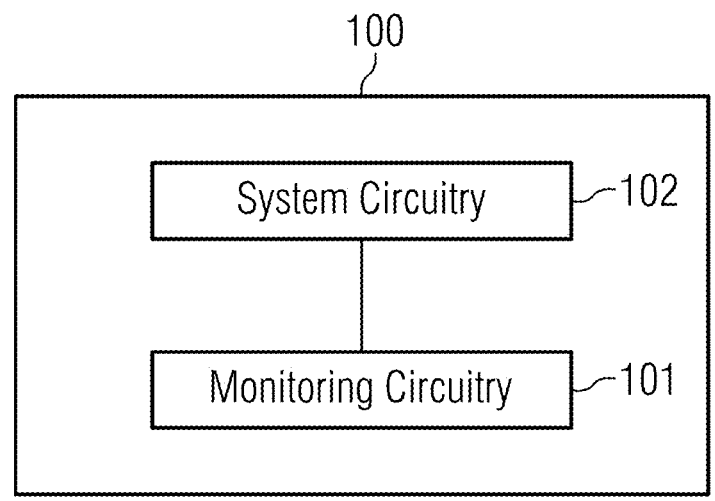
FIG. 1 is a schematic drawing of an exemplary integrated circuit chip device.

FIG. 1 illustrates the general structure of an exemplary monitoring network for a SoC 100. Monitoring circuitry 101 is arranged to monitor system circuitry 102. For example, for the purposes of detecting improper operation of core devices of the system circuitry relating to safety or security concerns.

Figure 2:
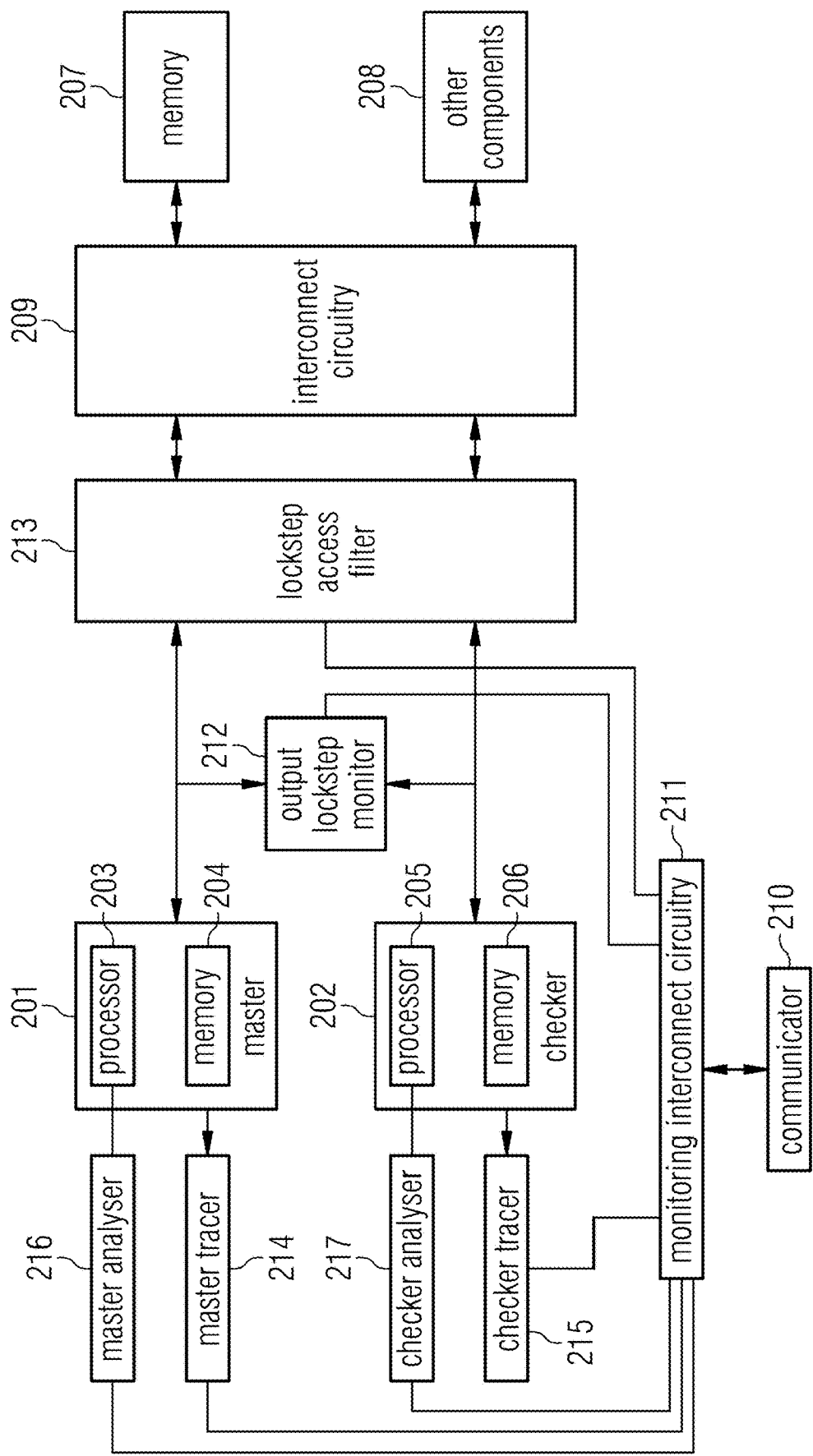
FIG. 2 is a schematic drawing of an exemplary monitoring network and system circuitry on an integrated circuit chip device.

FIG. 2 illustrates an exemplary integrated circuit chip device comprising monitoring circuitry and system circuitry. In FIG. 2, system circuitry comprises a master device 201 and a checker device 202. The master device comprises a processor 203 and a memory 204. The checker comprises a processor 205 and a memory 206. The processor 205 and memory 206 of the checker device 202 are functionally the same as the processor 203 and memory 204 of the master device 201. The processor 205 of the checker device is configured to operate in lockstep with the processor 203 of the master device. In other words, the processor 205 runs the same code as the processor 203. Suitably, the processor 205 runs the code at the same clock speed as the processor 203. The processors 203 and 205 may be time synchronised, such that they run the same code at the same time. Alternatively, the processors 203 and 205 may be temporally offset by n clock cycles. For example, 0.5<n<32. This helps to mitigate the effect of a transient error in the SoC causing the same error to occur in the execution of the code by both processors. The processors 203 and 205 may be clocked by the same clock. If the processors 203 and 205 both receive the same clock signal directly from the same clock, then they are time synchronised. Alternatively, a delay may be introduced into the clock signal received by one of the processors relative to the other processor so as to achieve the n cycle time offset. The processors may alternatively be clocked by different clocks. Those different clocks may have the same clock frequency. In this case, the processors are temporally offset by n clock cycles. The different clocks may have different clock frequencies. This leads to the processors operating at different clock speeds.

Although only one checker device 202 is shown on FIG. 2, further checker devices may also be integrated onto the SoC. Each further checker device comprises a processor and a memory, each of which are functionally the same as the processor 203 and memory 204 of the master device 201, and operate in lockstep as described above. Thus, the master device 201 and the one or more checker devices 202 form a redundant backup configuration.

The master device 201 is one which initiates traffic, such as read/write requests in a network. Examples of master devices are processors such as a DSP (digital signal processor), video processor, applications processor, CPU (central processor unit), and GPU (graphics processor unit). Any programmable processor may be a master device. Other examples of master devices are those with DMA (direct memory access) capability, such as conventional DMAs for moving data from one location to another, autonomous coprocessors with DMA capability (such as an encryption engine), and peripherals with DMA capability (such as an Ethernet controller).

The system circuitry of FIG. 2 also comprises system memory 207. The system memory may be a single memory on the SoC. Alternatively, the system memory may be distributed among the SoC. In the context of the methods described below, the master device issues read/write requests to the system memory 207.

The system circuitry of FIG. 2 also comprises other componentry 208. The other componentry 208 may include other master devices of the types listed above. The other componentry 208 may also include slave devices which respond to the commands of the master devices. Examples of slave devices are on-chip memories, memory controllers for off-chip memories (such as DRAM), and peripheral units.

Finally, the system circuitry of FIG. 2 also includes interconnect circuitry 209. The interconnect circuitry forms a communication backbone for the SoC, through which the components of the system circuitry communicate with each other. These communications are bi-directional. The interconnect circuitry is communicatively connected to each of the master device 201, the checker device 202, the system memory 207 and the other componentry 208. The topology of the interconnect circuitry 209 is SoC dependent. For example, it may comprise any one or combination of the following types of network to transport communications around the system circuitry: a bus network, a ring network, a tree network, or a mesh network.

The monitoring circuitry comprises several monitoring components which are all connected to communicator 210 by monitoring interconnect circuitry 211. Suitably, the connections between the monitoring components and the monitoring interconnect circuitry 211 are bidirectional. Suitably, the connection between the monitoring interconnect circuitry 211 and the communicator 210 is bidirectional. The communicator 210 may be an interface for communicating with entities off-chip. For example, the monitoring components may communicate with an off-chip analyser via communicator 210. Communicator 210 may additionally or alternatively be configured to communicate with other entities on-chip. For example, the monitoring components may communicate with an on-chip analyser via communicator 210. Although FIG. 2 illustrates one communicator 210, any number of communicators can be integrated onto the SoC. The communicators implemented are chosen in dependence on the type of connections that are to be made. Exemplary communicators include: JTAG, parallel trace input/output, and Aurora based high-speed serial interface; and reuse of system interfaces such as USB, Ethernet, RS232, PCIe and CAN.

The topology of the monitoring interconnect circuitry 211 may comprise any one or combination of the following types of network to transport communications around the monitoring circuitry: a bus network, a ring network, a tree network, or a mesh network. The communication links between the monitoring components and the communicator 210 are bi-directional.

The monitoring circuitry comprises an output lockstep monitor 212. The output lockstep monitor 212 receives as inputs both an output of the master device 201 and an output of the checker device 202. The output lockstep monitor 212 observes the received outputs of both the master device 201 and the checker device 202, and compares these. If the master processor and the checker processor are clocked at the same speed, the corresponding items compared by the output lockstep monitor 212 may be of any length from a single bit to a whole transaction. If the master processor and the checker processor are clocked at different speeds, the corresponding items compared by the output lockstep monitor 212 are longer, i.e. whole transactions. In other words, because the master processor and checker processor are not time synchronised, the output lockstep monitor 212 waits for both the master processor and checker processor to complete a whole transaction (which they will complete at different times) before comparing their outputs. The output of the output lockstep monitor 212 is connected to the communicator 210 via the monitoring interconnect circuitry 211.

Figure 3:
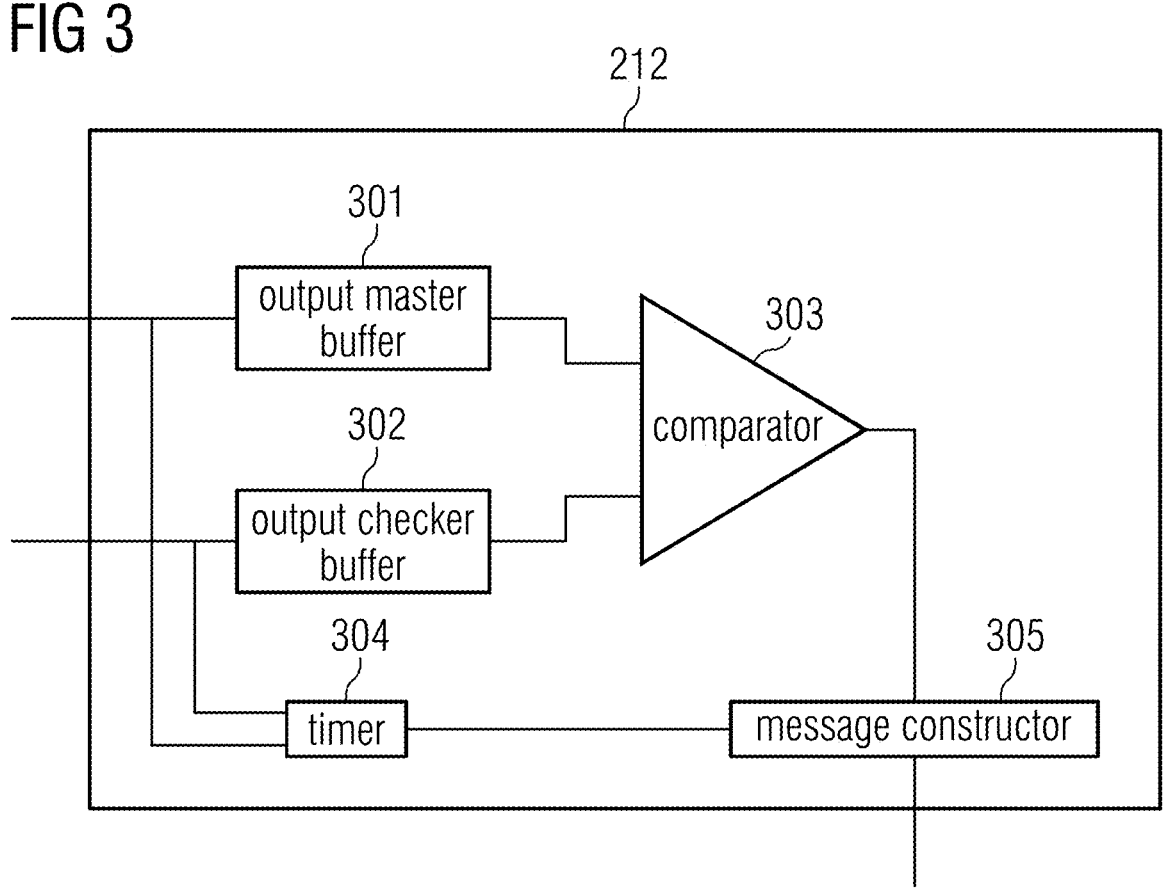
FIG. 3 is a schematic drawing of an exemplary output lockstep monitor.
Figure 4:
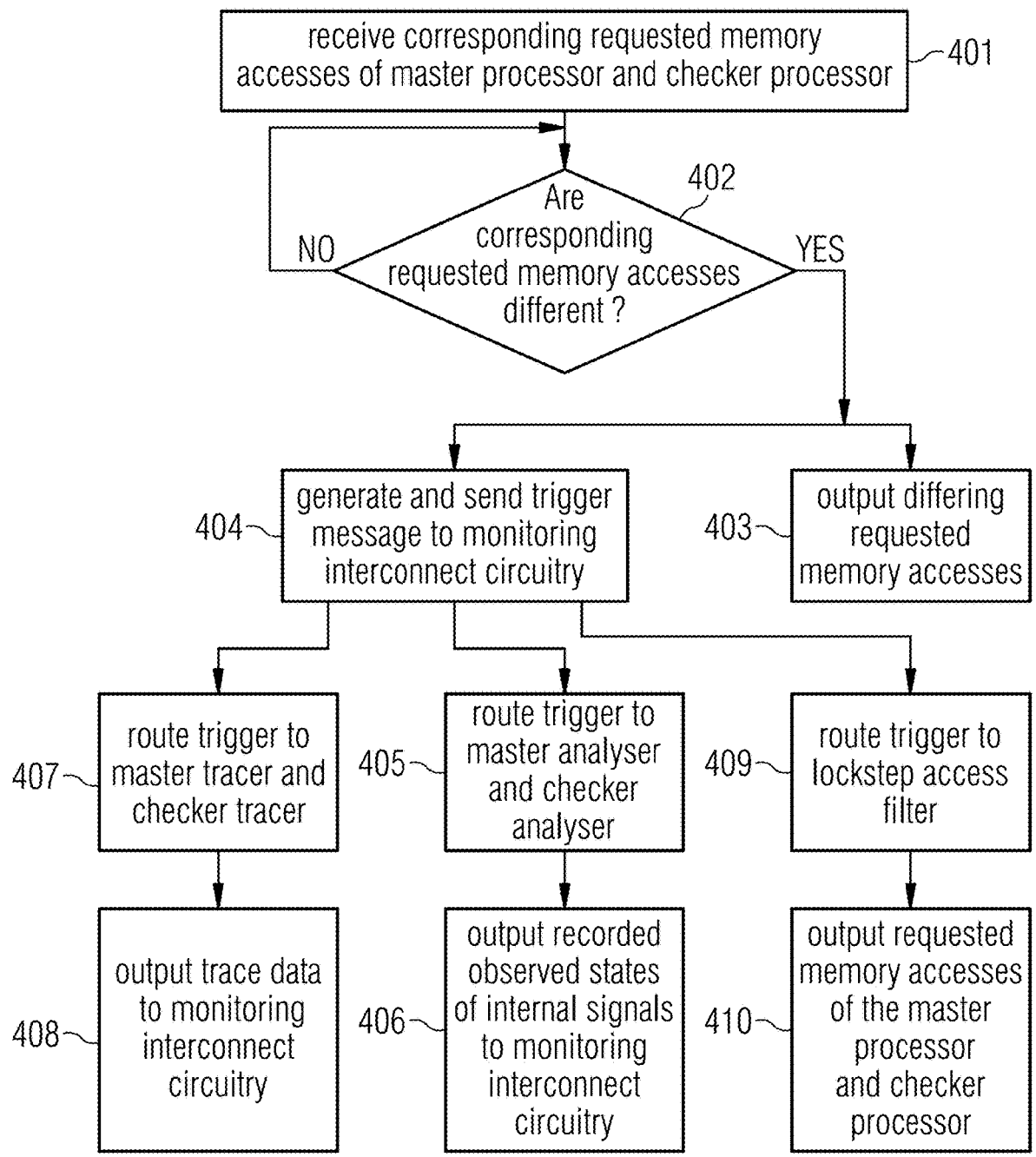
FIG. 4 is a flowchart of a method of detecting and responding to divergence in the system accesses of processors operating in lockstep.

FIG. 3 illustrates an example internal structure of the output lockstep monitor 212. The output of the master processor 203 is provided as an input to an output master buffer 301. The output of the checker processor 205 is provided as an input to an output checker buffer 302. If there is at least one item in each buffer 301 and 302, then the leading item in each buffer is output to comparator 303. Comparator 303 compares the two leading items. The output of the comparator identifies whether the items are the same or different. The comparator output is input to message constructor 305. Message constructor 305 generates messages. Suitably, message constructor 305 generates a message if the comparator identifies that the items at the head of the buffers 301 and 302 are different. That message may identify that corresponding outputs of the master processor 203 and checker processor 205 are different. The message may additionally comprise the differing outputs of the master processor 203 and the checker processor 205. The message constructor 305 then outputs this message from the output lockstep monitor to the monitoring interconnect circuitry 211. Various different actions may be taken in response to this message, as will be discussed further below.

The items input to the buffers 301 and 302 may be requests by the master processor 203 and the checker processor 205 to access system memory 207. In this example, the output lockstep monitor 212 checks whether the same memory accesses commanded by the master processor 203 are also commanded by the checker processor 205 in the same order. For example, the read requests of the master processor 203 may be extracted from the master device output and input to the output master buffer 301, and the read requests of the checker processor 202 may be extracted from the checker device output and input to the output checker buffer 302. As another example, the write requests of the master processor 203 may be extracted from the master device output and input to the output master buffer 301, and the write requests of the checker processor 202 may be extracted from the checker device output and input to the output checker buffer 302. The output lockstep monitor 212 may comprise a set of output master buffers, each one for storing a different output of the master processor 203. The output lockstep monitor 212 may also comprise a corresponding set of output checker buffers, each one for storing a different output of the checker processor 205 which corresponds to an output of the master processor 203. The output lockstep monitor 212 may comprise one or a set of comparators that compare corresponding processor output items from corresponding output master and output checker buffers. The comparator(s) output to the message constructor 305, which constructs a message on identifying a discrepancy between any corresponding output of the master processor 203 and the checker processor 205.

Suitably, the output lockstep monitor operates at the runtime of the processors 203 and 205. Thus, there is minimal delay between the master processor 203 and checker processor 205 generating a different output, and that output being identified by the output lockstep monitor and communicated to the monitoring interconnect circuitry 211.

The output lockstep monitor may further comprise a timer 304. The timer 304 counts the elapsed time between an output of the master processor 203 being accumulated in the output master buffer 301 and the corresponding output of the checker processor 205 being accumulated in the output checker buffer 302. The timer 304 has a timeout threshold. If the count reaches the value of the timeout threshold before both of the corresponding outputs are in the buffers 301 and 302, then the timer outputs an indication of this to the message constructor 305. The message constructor 305 generates an alert message which it outputs from the output lockstep monitor 212 to the monitoring interconnect circuitry 212.

Returning to FIG. 2, the monitoring circuitry also comprises a lockstep access filter 213. The lockstep access filter 213 receives as inputs the output of the master device 201 and the output of the checker device 202. The lockstep access filter 213 has a bi-directional connection to both the master device 201 and the checker device 202. The lockstep access filter 213 also has a bi-directional connection to the interconnect circuitry 209. The lockstep access filter 213 also outputs to the monitoring interconnect circuitry 211, with which it has a bidirectional connection. The lockstep access filter 213 may be internal to the output lockstep monitor 212. Alternatively, lockstep access filter may be external to the output lockstep monitor 212 as shown in FIG. 2. The lockstep access filter 213 filters the outputs of the master device and checker device which are sent to the interconnect circuitry 209 for routing to other system circuitry. It does this at the runtime of the master processor 203 and checker processor 205.

For example, the lockstep access filter 213 may receive the system memory access requests of both the master processor 203 and the checker processor 205. The lockstep access filter 213 may prevent the system memory accesses requested by the checker processor from propagating to the system memory 207. For example, the lockstep access filter 213 may receive corresponding read requests from the master processor 203 and checker processor 205. The lockstep access filter 213 forwards the read request of the master processor 203 onto the system memory 207 via the interconnect circuitry 209. The lockstep access filter 213 prevents the read request of the checker processor 203 from being propagated to the system memory 207 via the interconnect circuitry 209. The lockstep access filter 213 then receives a read response from the system memory 207 to the read request of the master processor 203 via the interconnect circuitry 209. The lockstep access filter 213 forwards the read response from the system memory 207 onto both the master processor 203 and the checker processor 205. In the case of several read responses, the lockstep access filter 213 forwards the read responses to both the master processor 203 and the checker processor 205 in the same order. The lockstep access filter 213 may comprise a counter which counts the read requests received from the checker processor 305. Only if the counter is greater than zero, does the lockstep access filter 213 forward the next read response to the checker processor 305. This ensures that a read response is not sent to the checker processor 305 before the read request is sent from the checker processor 305.

As another example, the lockstep access filter 213 may receive corresponding write requests from the master processor 203 and checker processor 205. The lockstep access filter 213 forwards the write request of the master processor 203 onto the system memory 207 via the interconnect circuitry 209. The lockstep access filter 213 terminates the write request of the checker processor 203. Hence, it prevents the write request of the checker processor 205 from being propagated to the system memory 207 via the interconnect circuitry 209. The lockstep access filter 213 then receives a write response from the system memory 207 via the interconnect circuitry 209 once the requested data has been written to system memory 207. The lockstep access filter 213 forwards the write response from the system memory 207 onto both the master processor 203 and the checker processor 205. In the case of several write responses, the lockstep access filter 213 forwards the write responses to both the master processor 203 and the checker processor 205 in the same order. The lockstep access filter 213 may comprise a counter which counts the write requests received from the checker processor 305. Only if the counter is greater than zero, does the lockstep access filter 213 forward the next write response to the checker processor 305. This ensures that a write response is not sent to the checker processor 305 before the write request is sent from the checker processor 305.

The lockstep access filter 213 may filter both the read requests and the write requests received from the master and checker processers as described above. In this case, the lockstep access filter 213 has a read counter for counting the read requests from the checker processor, and separately a write counter for counting the write requests from the checker processor.

The monitoring circuitry of FIG. 2 further comprises a master tracer 214. The master tracer 214 receives the output of the master processor 203. The master tracer 214 records the output of the master processor 203 in a buffer. For example, the master tracer 214 may comprise a circular buffer in which it records the output of the master processor 203. This buffer is arranged to overwrite older received data once it has reached its storing capacity, in a circular manner. When triggered, the master tracer 214 outputs the contents of its buffer to the communicator 210 via the monitoring interconnect circuitry 211 as master trace data. When triggered, the master tracer 214 may also output further master trace data to the communicator 210 as it is collected in the buffer of the master tracer 214.

The monitoring circuitry of FIG. 2 further comprises a checker tracer 215. The checker tracer 215 receives the output of the checker processor 205. The checker tracer 215 records the output of the checker processor 205 in a buffer. For example, the checker tracer 215 may comprise a circular buffer in which it records the output of the checker processor 205. This buffer is arranged to overwrite older received data once it has reached its storing capacity, in a circular manner. When triggered, the checker tracer 215 outputs the contents of its buffer to the communicator 210 via the monitoring interconnect circuitry 211 as checker trace data. When triggered, the checker tracer 215 may also output further checker trace data to the communicator 210 as it is collected in the buffer of the checker tracer 215.

The monitoring circuitry of FIG. 2 further comprises analysing circuitry consisting of a master analyser 216 and a checker analyser 217. The master analyser 216 is connected to the master processor 203. The master analyser 216 outputs to the monitoring interconnect circuitry 211. The checker analyser 217 is connected to the checker processor 205. The checker analyser 217 outputs to the monitoring interconnect circuitry 211. Each of these analysers 216 and 217 observes states of internal signals of its connected processor. It may then record these observed states in a buffer within the analyser. The buffer may be, for example, a circular buffer. The circular buffer is arranged to overwrite older observed states once it has reached its storing capacity, in a circular manner. The internal signals observed may be one or more of: an instruction which is being executed by the processor, the state of a register of the memory connected to the processor such as the control status register, the value of a particular entry in a register of the memory connected to the processor, the program counter interrupt status, a stall signal of the processor. When triggered, each analyser 216, 217 outputs the contents of its buffer to the communicator 210 via the monitoring interconnect circuitry 211. When triggered, each analyser 216, 217 may also output further observed states to the communicator 210 as those observed states are recorded in the buffers of the analysers.

A method for detecting and responding to divergent memory accesses by processors operating in lockstep will now be described with reference to FIG. 4.

At step 401, the output lockstep monitor 212 receives corresponding requested memory accesses from the master processor 203 and the checker processor 205. These requested memory accesses may be stored, for example, in buffers 301 and 302. At step 402, if at least one requested memory access has been received from both the master processor and the checker processor, then it is determined whether, for a memory access by the master processor, the corresponding memory access by the checker processor is different. Step 402 may be implemented, for example, at comparator 303. If the answer is NO, then the method returns to step 402, and repeats the question for the next memory access by the master. If the answer to step 402 is YES, then the method moves to steps 403 and 404. At step 403, the output lockstep monitor 212 outputs the corresponding memory accesses which are different.

At step 404 a trigger message is generated and sent to the monitoring interconnect circuitry 211. For example, the trigger message may be generated and sent by message constructor 305. The monitoring interconnect circuitry 211 routes the trigger message to other monitoring components. For example, at step 405, the monitoring interconnect circuitry 211 may route the trigger message to master analyser 216 and checker analyser 217. At step 406, the master analyser 216 responds to receipt of the trigger by outputting the recorded observed states of internal signals of the master processor from its buffer to communicator 210 via monitoring interconnect circuitry 211. The master analyser 216 may also respond to receipt of the trigger by outputting further observed states of internal signals from the master processor as they are collected in the buffer of the master analyser 216. Similarly, at step 406, the checker analyser 217 responds to receipt of the trigger by outputting the recorded observed states of internal signals of the checker processor from its buffer to communicator 210 via monitoring interconnect circuitry 211. The checker analyser 217 may also respond to receipt of the trigger by outputting further observed states of internal signals from the checker processor as they are collected in the buffer of the checker analyser 217. The communicator 210 may then route the observed states to an off-chip or on-chip analyser for subsequent analysis. This subsequent analysis may be done off-line. In other words, not at the runtime of the processors 203 and 205.

The monitoring interconnect circuitry 211 may also route the trigger message, at step 407, to the master tracer 214 and the checker tracer 215. At step 408, the master tracer 214 responds to receipt of the trigger by outputting the recorded output of the master processor 203 as master trace data from its buffer to communicator 210 via monitoring interconnect circuitry 211. The master tracer 214 may also respond to receipt of the trigger by outputting further master trace data as it is collected in the buffer of the master tracer 214. Similarly, at step 408, the checker tracer 215 responds to receipt of the trigger by outputting the recorded output of the checker processor 205 as checker trace data from its buffer to communicator 210 via monitoring interconnect circuitry 211. The checker tracer 215 may also respond to receipt of the trigger by outputting further checker trace data as it is collected in the buffer of the checker tracer 215. The communicator 210 may then route the trace data to an off-chip or on-chip analyser for subsequent analysis. This subsequent analysis may be done off-line. In other words, not at the runtime of the processors 203 and 205.

The monitoring interconnect circuitry 211 may also route the trigger message, at step 409, to the lockstep access filter 213. At step 410, the lockstep access filter 213 responds to receipt of the trigger by outputting requested memory accesses of the master processor and the checker processor to communicator 210 via monitoring interconnect circuitry 211. The communicator 210 may then route the requested memory accesses to an off-chip or on-chip analyser for subsequent analysis. This subsequent analysis may be done off-line. In other words, not at the runtime of the processors 203 and 205.

In addition to triggering the monitoring components, the monitoring interconnect circuitry may also send an alert to the communicator 210, which the communicator 210 then routes on to the off-chip or on-chip analyser. The monitoring interconnect circuitry may cause the master processor 203 and checker processor 205 to halt processing. The monitoring interconnect circuitry may cause the master processor 203 and checker processor 205 (or the whole system circuitry) to reset.

Figure 5:
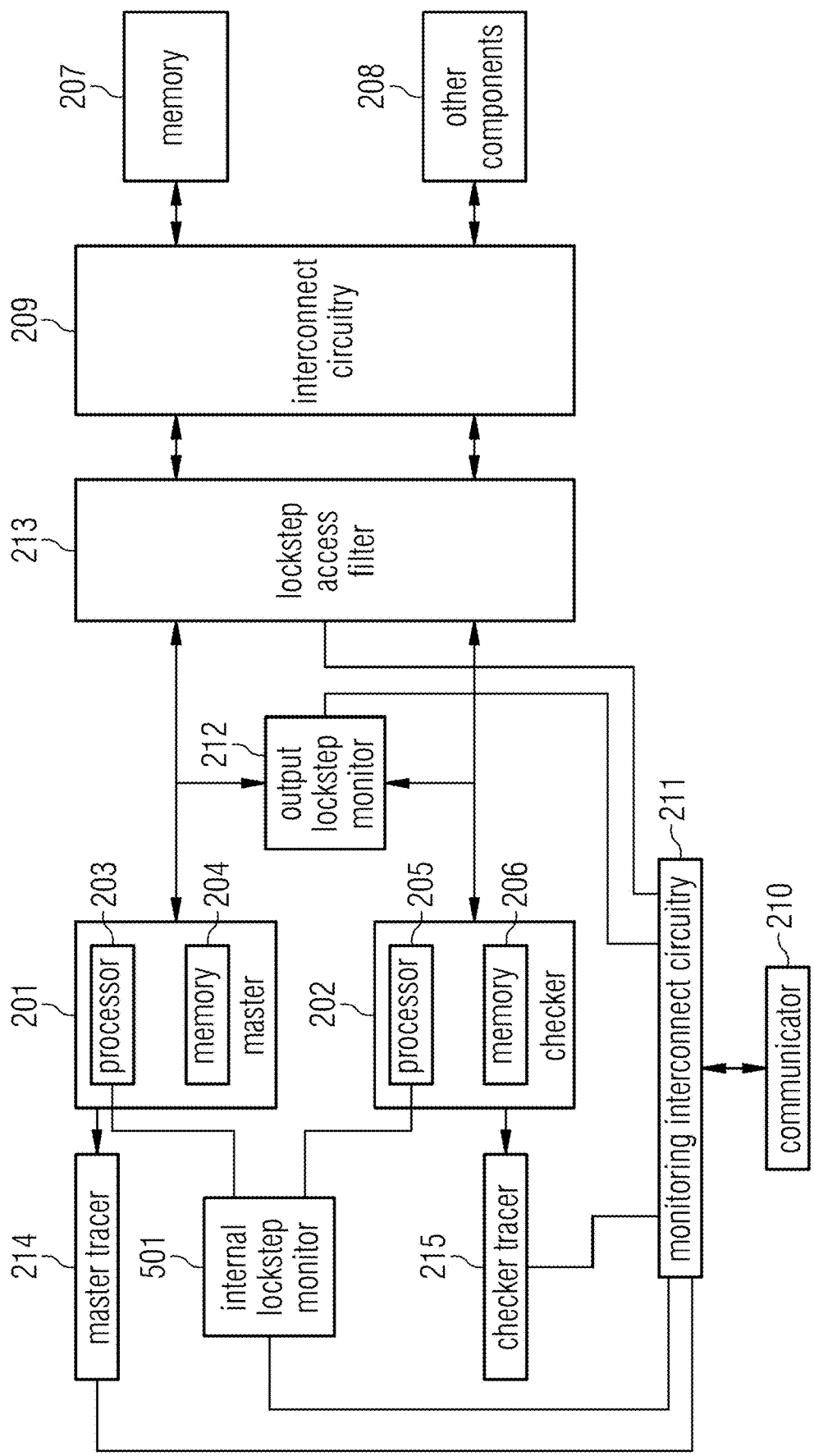
FIG. 5 is a schematic drawing of an exemplary monitoring network and system circuitry on an integrated circuit chip device.

FIG. 5 illustrates another exemplary integrated circuit chip device comprising monitoring circuitry and system circuitry. The device of FIG. 5 differs from that of FIG. 2 in that it does not have a separate master analyser 216 and checker analyser 217. Instead, the device of FIG. 5 has an internal lockstep monitor 501 which is connected to both the master processor 203 and the checker processor 205. The internal lockstep monitor 501 outputs to the monitoring interconnect circuitry 211. The internal lockstep monitor 501 observes states of internal signals of both the master processor 203 and the checker processor 205. It may then record these observed states in buffers within the analyser. Each buffer may be, for example, a circular buffer. The internal signals observed may be one or more of: an instruction which is being executed by the processor, the state of a register of the memory connected to the processor such as the control status register, the value of a particular entry in a register of the memory connected to the processor, the program counter interrupt status, a stall signal of the processor. The analyser may output the recorded observed states to the monitoring interconnect circuitry 211. The other components of the device of FIG. 5 are the same as those of FIG. 2, and hence will not be described again here.

Figure 6:
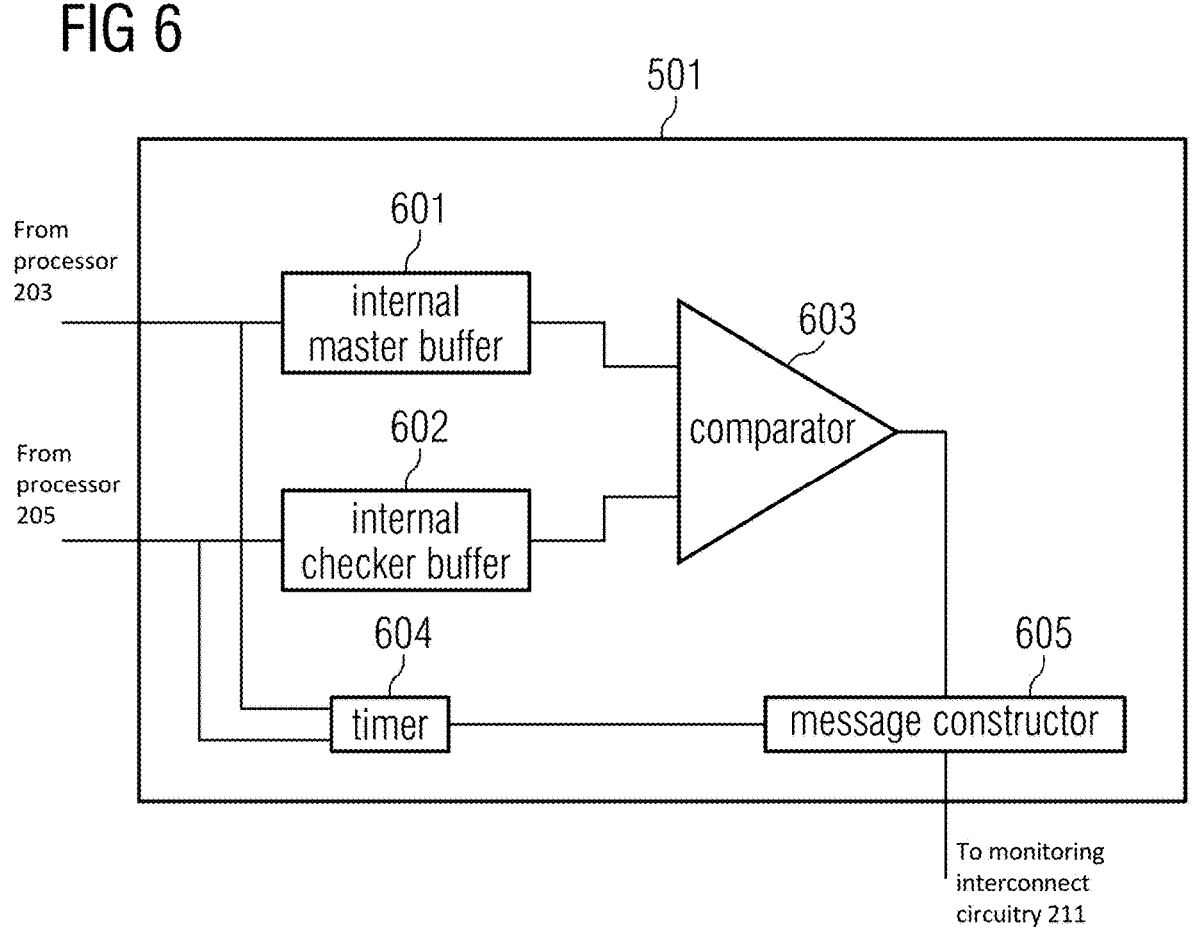
FIG. 6 is a schematic drawing of an exemplary internal lockstep monitor.
Figure 7:
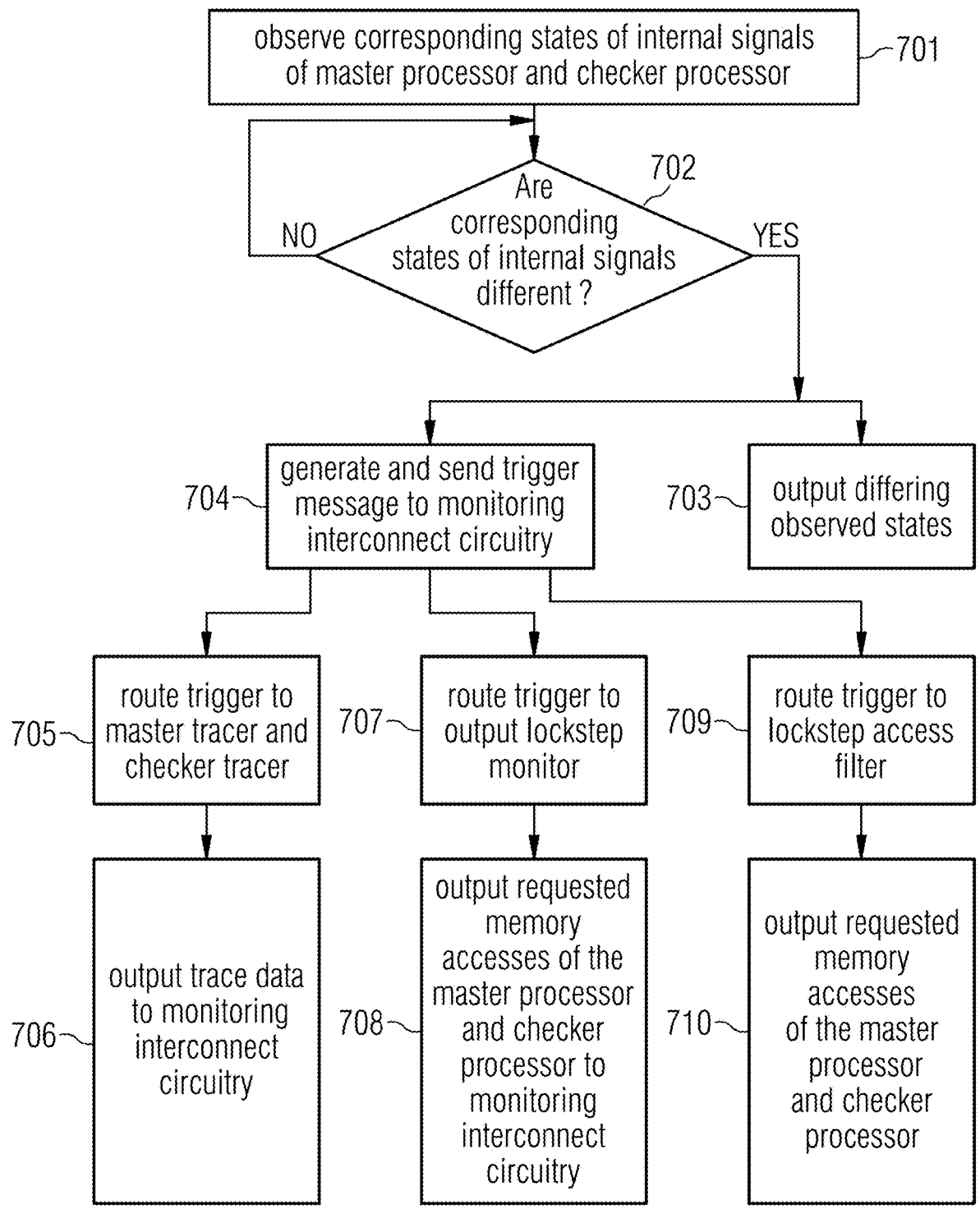
FIG. 7 is a flowchart of a method of detecting and responding to divergence in the states of internal signals of processors operating in lockstep.

FIG. 6 illustrates an example internal structure of the internal lockstep monitor 501. States of internal signals of the master processor 203 are provided as an input to an internal master buffer 601. States of internal signals of the checker processor 205 are provided as an input to an internal checker buffer 602. If there is at least one item in each buffer 601 and 602, then the leading item in each buffer is output to comparator 603. Comparator 603 compares the two leading items. The output of the comparator identifies whether the items are the same or different. The comparator output is input to message constructor 605. Message constructor 605 generates messages. Suitably, message constructor 605 generates a message if the comparator identifies that the items at the head of the buffers 601 and 602 are different. That message may identify that corresponding states of internal signals of the master processor 203 and checker processor 205 are different. The message may additionally comprise the differing states of the internal signals from the master processor 203 and the checker processor 205. The message constructor 605 then outputs this message from the internal lockstep monitor to the monitoring interconnect circuitry 211. Various different actions may be taken in response to this message, as will be discussed further below.

Suitably, the internal lockstep monitor 501 operates at the runtime of the processors 203 and 205. Thus, there is minimal delay between the master processor 203 and checker processor 205 having different states of an internal signal, and those different states being identified by the internal lockstep monitor 501 and communicated to the monitoring interconnect circuitry 211.

The internal lockstep monitor may further comprise a timer 604. The timer 604 counts the elapsed time between a state of an internal signal of the master processor 203 being accumulated in the internal master buffer 601 and the corresponding state of an internal signal of the checker processor 205 being accumulated in the internal checker buffer 602. The timer 604 has a timeout threshold. If the count reaches this timeout threshold before both of the corresponding outputs are in the buffers 601 and 602, then the timer outputs this to the message constructor 605. The message constructor 605 generates an alert message which it outputs from the internal lockstep monitor 501 to the monitoring interconnect circuitry 212.

The method of FIG. 4 may be implemented on the integrated circuit chip device of FIG. 5. All the steps of the method are the same except for steps 405 and 406. Instead of step 405, the trigger is routed to the internal lockstep monitor 501. The internal lockstep monitor 501 responds to receipt of the trigger by outputting the recorded observed states of corresponding internal signals of the master processor and the checker processor from its buffers to communicator 210 via monitoring interconnect circuitry 211. The communicator 210 may then route the observed states to an off-chip or on-chip analyser for subsequent analysis. This subsequent analysis may be done off-line. In other words, not at the runtime of the processors 203 and 205.

A method for detecting and responding to divergent states of internal signals of processors operating in lockstep will now be described with reference to FIG. 7.

At step 701, the internal lockstep monitor 501 observes corresponding states of internal signals from the master processor 203 and the checker processor 205. These states of internal signals may be stored, for example, in buffers 601 and 602. At step 702, if at least one state of an internal signal has been received from both the master processor and the checker processor, then it is determined whether, for a state of the internal signal of the master processor, the corresponding state of the internal signal of the checker processor is different. Step 702 may be implemented, for example, at comparator 603. If the answer is NO, then the method returns to step 702, and repeats the question for the next state of the internal signal by the master processor. If the answer to step 702 is YES, then the method moves to steps 703 and 704. At step 703, the internal lockstep monitor 501 outputs the corresponding internal signal states which were different.

At step 704 a trigger message is generated and sent to the monitoring interconnect circuitry 211. For example, the trigger message may be generated and sent by message constructor 605. The monitoring interconnect circuitry 211 routes the trigger message to other monitoring components. For example, at step 705, the monitoring interconnect circuitry 211 may route the trigger message to the master tracer 214 and the checker tracer 215. At step 706, the master tracer 214 responds to receipt of the trigger by outputting the recorded output of the master processor 203 as master trace data from its buffer to communicator 210 via monitoring interconnect circuitry 211. The master tracer 214 may also respond to receipt of the trigger by outputting further master trace data as it is collected in the buffer of the master tracer 214. Similarly, at step 706, the checker tracer 215 responds to receipt of the trigger by outputting the recorded output of the checker processor 205 as checker trace data from its buffer to communicator 210 via monitoring interconnect circuitry 211. The checker tracer 215 may also respond to receipt of the trigger by outputting further checker trace data as it is collected in the buffer of the checker tracer 215. The communicator 210 may then route the trace data to an off-chip or on-chip analyser for subsequent analysis. This subsequent analysis may be done off-line. In other words, not at the runtime of the processors 203 and 205.

The monitoring interconnect circuitry 211 may also route the trigger message, at step 707, to the output lockstep monitor 212. At step 708, the output lockstep monitor 212 responds to receipt of the trigger by outputting requested memory accesses of the master processor and the checker processor to communicator 210 via monitoring interconnect circuitry 211. The communicator 210 may then route the requested memory accesses to an off-chip or on-chip analyser for subsequent analysis. This subsequent analysis may be done off-line. In other words, not at the runtime of the processors 203 and 205.

The monitoring interconnect circuitry 211 may also route the trigger message, at step 709, to the lockstep access filter 213. At step 710, the lockstep access filter 213 responds to receipt of the trigger by outputting requested memory accesses of the master processor and the checker processor to communicator 210 via monitoring interconnect circuitry 211. The communicator 210 may then route the requested memory accesses to an off-chip or on-chip analyser for subsequent analysis. This subsequent analysis may be done off-line. In other words, not at the runtime of the processors 203 and 205.

In addition to triggering the monitoring components, the monitoring interconnect circuitry may also send an alert to the communicator 210, which the communicator 210 then routes on to the off-chip or on-chip analyser. The monitoring interconnect circuitry may cause the master processor 203 and checker processor 205 to halt processing. The monitoring interconnect circuitry may cause the master processor 203 and checker processor 205 (or the whole system circuitry) to reset.

The master analyser 216 and checker analyser 217 of FIG. 2 may be configured in run time to change the internal signals it observes the states of. For example, the on-chip or off-chip analyser may send a configuration command via the monitoring interconnect circuitry 211 to the master analyser and checker analyser commanding them to observe particular internal signals of the master processor 203 and checker processor 205. Similarly, the internal lockstep monitor 501 of FIG. 5 may be configured in run time to change the internal signals it observes the states of. For example, the on-chip or off-chip analyser may send a configuration command via the monitoring interconnect circuitry 211 to the internal lockstep monitor 501 commanding it to observe particular internal signals of the master processor 203 and checker processor 205. On detecting a trigger, the on-chip or off-chip analyser may send a configuration command to the internal lockstep monitor 501 commanding it to change the particular internal signals of the master processor 203 and checker processor 205 that it is observing.

As mentioned above, the integrated circuit chip device (of either FIG. 2 or FIG. 5) may comprise more than one checker device 202. Each further checker device comprises a further checker processor and a further checker memory. Each further checker processor operates in lockstep with the master processor and the checker processor. Output lockstep monitor 212 may comprise an additional output checker buffer for each additional further checker processor. The comparator 303 may be configured to compare corresponding outputs of all of the master processor, checker processor and each further checker processor. If any of the corresponding outputs differ, the message constructor 305 generates a trigger to send to the monitoring interconnect circuitry. The monitoring interconnect circuitry 211 responds to that trigger as described above. The lockstep access filter 213 performs the same actions for each further checker processor as it does for the checker processor.

In the case of the integrated circuit chip device of FIG. 2, a further checker analyser and further checker tracer are provided for each further checker device. Each further checker analyser and further checker tracer operates as the described checker analyser and checker tracer respectively. Each further checker analyser and further checker tracer receives trigger messages from the monitoring interconnect circuitry at steps 405 and 407 of FIG. 4, and responds in the same manner as the checker analyser and checker tracer.

In the case of the integrated circuit chip device of FIG. 5, the internal lockstep monitor 501 may comprise an additional internal checker buffer for each additional further checker processor. The comparator 603 may be configured to compare corresponding states of internal signals of all of the master processor, checker processor and each further checker processor. If any of the corresponding states of the internal signals differ, the message constructor 605 generates a trigger to send to the monitoring interconnect circuitry. The monitoring interconnect circuitry 211 responds to that trigger as described above.

All of the checker and further checker processors may operate concurrently with the master processor. Alternatively, the checker and further checker processors may use voting or other redundancy schemes. In a voting system, more than m of the checker devices may be required to have a different corresponding output to the master device in order for the message constructor to generate a trigger to send to the monitoring interconnect circuitry. m>1. For example, m may be 2. The checker and further checker processors may alternatively operate in a split/lock mode in which the lockstep function of each of the checker processors may be dynamically engaged and disengaged with the master processor. This allows the processors to run in a redundant mode when there is capacity to do so, but also to each execute different code for a higher performance of the SoC when needed.

The apparatus and methods described herein aid functional safety of the SoC by checking that the master processor is operating reliably, safely and securely.

Each component of the SoCs illustrated in FIGS. 1, 2, 3, 5 and 6 may be implemented in dedicated hardware. Doing so enables the methods described herein to be implemented at wire speed, thereby imposing no execution overhead on the SoC. Alternatively, each component of the SoC illustrated in FIGS. 1, 2, 3, 5 and 6 may be implemented in software. Some components may be implemented in software, whilst other components are implemented in dedicated hardware.

The SoC described is suitably incorporated within a computing-based device. The computing-based device may be an electronic device. Suitably, the computing-based device comprises one or more processors for processing computer executable instructions to control operation of the device in order to implement the methods described herein. The computer executable instructions can be provided using any computer-readable media such as a memory. The methods described herein may be performed by software in machine readable form on a tangible storage medium. Software can be provided at the computing-based device to implement the methods described herein.

The above description describes the system circuitry and monitoring circuitry as being comprised on the same SoC. In an alternative implementation, the system circuitry and monitoring circuitry are comprised across two or more integrated circuit chips of an MCM. In an MCM, the integrated circuit chips are typically stacked or located adjacently on an interposer substrate. Some system circuitry may be located on one integrated circuit chip and other system circuitry located on a different integrated circuit chip of the MCM. Similarly, the monitoring circuitry may be distributed across more than one integrated circuit chip of the MCM. Thus, the method and apparatus described above in the context of a SoC also apply in the context of an MCM.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. An integrated circuit (IC) chip comprising:
system circuitry comprising system memory, a master processor, and a checker processor configured to operate in lockstep; and
monitoring circuitry comprising an internal lockstep monitor, a master tracer, and a checker tracer, the internal lockstep monitor configured to:
observe states of internal signals of the master processor and the checker processor,
compare corresponding observed states of the master processor and the checker processor, and
when the corresponding observed states differ:
trigger the master tracer to output stored master trace data recorded from an output of the master processor, and
trigger the checker tracer to output stored checker trace data recorded from an output of the checker processor.

2. The IC chip of claim 1, wherein the internal lockstep monitor is further configured to output the corresponding observed states when the corresponding observed states differ.

3. The IC chip of claim 1, wherein the internal lockstep monitor comprises:
an internal master buffer configured to accumulate observed states of the master processor;
an internal checker buffer configured to accumulate observed states of the checker processor; and
a comparator configured to compare each observed state of the master processor from the internal master buffer with the corresponding observed state of the checker processor from the internal checker buffer.

4. The IC chip of claim 3, wherein the internal lockstep monitor further comprises a timer configured to:
count an elapsed time between an observed state of the master processor being accumulated in the internal master buffer and an observed state of the checker processor being accumulated in the internal checker buffer; and
output an alert when the elapsed time exceeds a timeout threshold.

5. The IC chip of claim 1, wherein the monitoring circuitry further comprises an output lockstep monitor configured to:
observe memory accesses requested by the master processor and the checker processor,
compare corresponding requested memory accesses of the master processor and the checker processor, and
when the corresponding requested memory accesses differ:
trigger the master tracer to output stored master trace data recorded from the output of the master processor,
trigger the checker tracer to output stored checker trace data recorded from the output of the checker processor, and
trigger the internal lockstep monitor to output observed states of the master processor and checker processor.

6. The IC chip of claim 5, wherein the internal lockstep monitor is configured to, when the corresponding observed states differ, trigger the output lockstep monitor to output requested memory accesses of the master processor and the checker processor.

7. The IC chip of claim 1, wherein the monitoring circuitry further comprises a lockstep access filter configured to:
receive the output of the master processor;
receive the output of the checker processor;
prevent requested memory accesses of the checker processor from propagating to the system memory; and
send messages to the checker processor from the system memory intended for the master processor.

8. The IC chip of claim 7, wherein the internal lockstep monitor is configured to, when the corresponding observed states differ, trigger the lockstep access filter to output requested memory accesses of the master processor and the checker processor.

9. The IC chip of claim 1, wherein the system circuitry further comprises a further checker processor configured to operate in lockstep with the master processor and the checker processor, and the internal lockstep monitor is configured to:
observe states of internal signals of the further checker processor,
compare corresponding observed states of the further checker processor, the master processor, and the checker processor, and
when any of the corresponding observed states differ:
trigger the master tracer to output stored master trace data recorded from the output of the master processor, and
trigger the checker tracer to output stored checker trace data recorded from the output of the checker processor.

10. The IC chip of claim 1, wherein the internal lockstep monitor is configured to carry out the observing, the comparing, the triggering of the master tracer, and the triggering of the checker tracer at runtime of the master processor and the checker processor.

11. An integrated circuit (IC) chip comprising:
system circuitry comprising system memory, a master processor, and a checker processor configured to operate in lockstep; and
monitoring circuitry comprising an output lockstep monitor and analyzing circuitry, the output lockstep monitor configured to:
observe requested memory accesses of the master processor and the checker processor,
compare corresponding requested memory accesses of the master processor and the checker processor, and
trigger the analyzing circuitry to output recorded observed states of internal signals of the master processor and checker processor when the corresponding requested memory accesses differ.

12. The IC chip of claim 11, wherein the monitoring circuitry further comprises a master tracer and a checker tracer, and
wherein, when the corresponding requested memory accesses differ, the output lockstep monitor is configured to:
trigger the master tracer to output stored master trace data recorded from the output of the master processor, and
trigger the checker tracer to output stored checker trace data recorded from the output of the checker processor.

13. The IC chip of claim 11, wherein the analyzing circuitry comprises a master analyzer configured to observe states of internal signals of the master processor, and a checker analyzer configured to observe states of internal signals of the checker processor.

14. The IC chip of claim 11, wherein the analyzing circuitry is an internal lockstep monitor configured to:
  observe states of internal signals of the master processor and the checker processor,
  compare corresponding observed states of the master processor and the checker processor, and
  when the corresponding observed states differ:
    trigger a master tracer to output stored master trace data recorded from an output of the master processor, and
    trigger a checker tracer to output stored checker trace data recorded from an output of the checker processor.

15. The IC chip of claim 14, wherein, when the corresponding observed states differ, the internal lockstep monitor is configured to trigger the output lockstep monitor to output requested memory accesses of the master processor and the checker processor.

16. The IC chip of claim 11, wherein the output lockstep monitor is further configured to output the corresponding requested memory accesses when the corresponding requested memory accesses differ.

17. The IC chip of claim 11, wherein the output lockstep monitor comprises:
  an output master buffer configured to accumulate memory access requests of the master processor;
  an output checker buffer configured to accumulate memory access requests of the checker processor; and
  a comparator configured to compare each memory access request of the master processor from the output master buffer with the corresponding memory access request of the checker processor from the output checker buffer.

18. The IC chip of claim 17, wherein the output lockstep monitor further comprises a timer configured to:
  count an elapsed time between a memory access request of the master processor being accumulated in the output master buffer, and a memory access request of the checker processor being accumulated in the output checker buffer; and
  output an alert when the elapsed time exceeds a timeout threshold.

19. The IC chip of claim 11, wherein the monitoring circuitry further comprises a lockstep access filter configured to:
  receive the output of the master processor;
  receive the output of the checker processor;
  prevent requested memory accesses of the checker processor from propagating to the system memory; and
  send messages to the checker processor from the system memory intended for the master processor.

20. The IC chip of claim 19, wherein the output lockstep monitor is configured to, when the corresponding requested memory accesses differ, trigger the lockstep access filter to output requested memory accesses of the master processor and the checker processor.

21. The IC chip of claim 11, wherein the system circuitry further comprises a further checker processor configured to operate in lockstep with the master processor and the checker processor, and the output lockstep monitor is configured to:
  observe requested memory accesses of the further checker processor, compare corresponding requested memory accesses of the further checker processor and master processor and checker processor, and
  if any of the corresponding requested memory accesses differ, trigger the analyzing circuitry to output recorded observed states of internal signals of the master processor and checker processor and further checker processor.

22. The IC chip of claim 11, wherein the output lockstep monitor is configured to carry out the observing, the comparing, the triggering at runtime of the master processor and the checker processor.

* * * * *